(12) United States Patent
Kwan et al.

(10) Patent No.: US 8,520,517 B2
(45) Date of Patent: Aug. 27, 2013

(54) SWITCH FABRIC END-TO-END CONGESTION AVOIDANCE MECHANISM

(75) Inventors: Bruce H. Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 131 days.

(21) Appl. No.: 12/031,914

(22) Filed: Feb. 15, 2008

(65) Prior Publication Data

US 2008/0198746 A1 Aug. 21, 2008

Related U.S. Application Data

(60) Provisional application No. 60/890,974, filed on Feb. 21, 2007.

(51) Int. Cl.
*H04L 12/26* (2006.01)

(52) U.S. Cl.
USPC .......................................... 370/231; 370/236

(58) Field of Classification Search
None
See application file for complete search history.

(56) References Cited

U.S. PATENT DOCUMENTS

| | | | |
|---|---|---|---|
| 6,031,821 A * | 2/2000 | Kalkunte et al. | 370/235 |
| 6,813,245 B1 * | 11/2004 | Furuno | 370/236 |
| 7,457,245 B2 * | 11/2008 | McAlpine et al. | 370/230 |
| 7,558,215 B2 * | 7/2009 | Rajan | 370/254 |
| 2003/0123393 A1* | 7/2003 | Feuerstraeter et al. | 370/235 |
| 2006/0165011 A1* | 7/2006 | Starr et al. | 370/252 |

* cited by examiner

*Primary Examiner* — Alex Skripnikov

(74) *Attorney, Agent, or Firm* — Sterne, Kessler, Goldstein & Fox PLLC

(57) ABSTRACT

Aspects of a switch fabric end-to-end congestion avoidance mechanism are presented. Aspects of a system for end-to-end congestion avoidance in a switch fabric may include at least one circuit that enables reception of a congestion notification message that specifies a traffic flow identifier. The circuitry may enable increase or decrease of a current rate for transmission of data link layer (DLL) protocol data units (PDU) associated with the specified traffic flow identifier as a response to the reception of the congestion notification message.

30 Claims, 15 Drawing Sheets

SWITCH FABRIC END-TO-END CONGESTION AVOIDANCE MECHANISM

CROSS-REFERENCE TO RELATED APPLICATIONS/INCORPORATION BY REFERENCE

This application makes reference to, claims priority to, and claims the benefit of U.S. Provisional Application Ser. No. 60/890,974 filed Feb. 21, 2007, which is hereby incorporated herein by reference in its entirety.

FIELD OF THE INVENTION

Certain embodiments of the invention relate to communication networks. More specifically, certain embodiments of the invention relate to a switch fabric end-to-end congestion avoidance mechanism.

BACKGROUND OF THE INVENTION

Packet switching fabrics may represent a cost-effective solution for backplane switching in systems such as blade servers and/or enterprise and/or metro area routers. In such fabrics, data flowing through the systems are transported as unsegmented packets, thereby avoiding costly segmentation and/or reassembly circuitry or logic.

A limitation in such systems is that the transport of unsegmented packets may result in congestion within the switching fabric. For example, when the switching fabric transfers packets received at a plurality of ingress ports to a single egress port, congestion may occur at the egress port if the aggregate data transfer rate of the plurality of ingress ports to the egress port is greater than the rate at which the switching fabric transfers packets from the egress port.

When congestion occurs, many conventional packet switching fabrics may utilize packet dropping methods that result in a packet, received at an ingress port, being discarded within the switching fabric. This may result in requirements that upper layer protocols (ULPs) detect and/or undertake recovery actions in response to the packets dropped within the switching fabric. This may further, impose limitations on applications, for which the ULPs do not detect and/or undertake recovery actions in response to dropped packets within the switching fabric.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A switch fabric end-to-end congestion avoidance mechanism, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a switch fabric end-to-end congestion avoidance mechanism. Various embodiments of the invention may comprise a fan area network (FAN) domain, which utilizes an end-to-end congestion avoidance mechanism. The FAN domain may comprise a FAN, one or more FAN domain transmitters (FDTs), and one or more FAN domain receivers (FDRs). The FAN may comprise one or more fabric devices. Various embodiments of the invention may comprise an end-to-end congestion avoidance mechanism congestion is detected within a path carrying data from an FDT to an FDR via the FAN. A fabric device within the FAN may send a congestion indication within the data carried via the path. The FDR may detect the congestion indication in the received data and transmit a congestion notification message to the FDT. The FDT may reduce a data transmission rate for data transmitted via the path in response to the received congestion notification message. The response by the FDT to the received congestion notification message may enable avoidance of a congestion condition that results in lost data within the FAN. Various embodiments of the invention may also be practiced for transporting network layer PDUs, transport layer PDUs, or for transporting PDUs associated with other protocol layers in an applicable protocol reference model (PRM).

Figure 1:
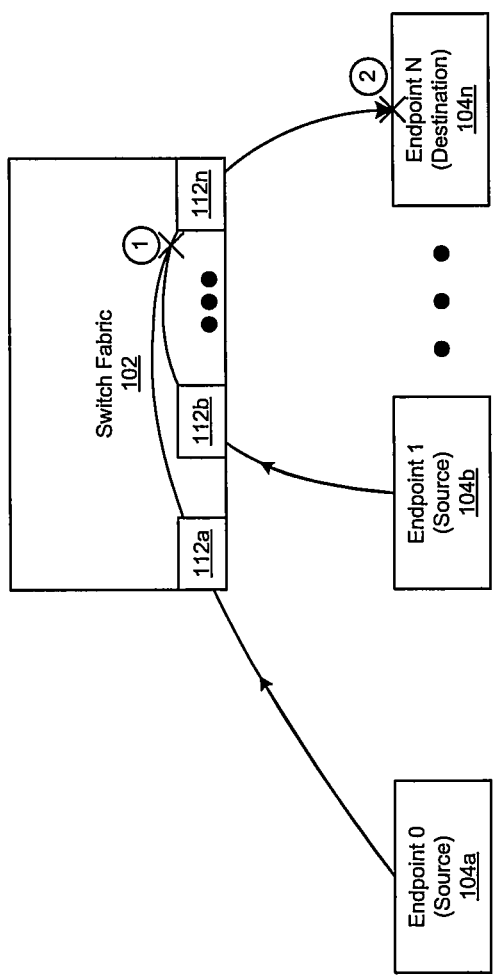
FIG. 1 is a block diagram of an exemplary single-stage fabric area network (FAN) domain, in accordance with an embodiment of the invention.

FIG. 1 is a block diagram of an exemplary single-stage fabric area network (FAN) domain, in accordance with an embodiment of the invention. Referring to FIG. 1, there is shown a switch fabric 102, and a plurality of endpoints: endpoint 0 104a, endpoint 1 104b, ..., and endpoint N 104n. N may be a number based on the number of endpoints in the FAN domain. The switch fabric 102 may comprise a plurality of ports 112a, 112b, ..., and 112n.

The switch fabric 102, or fabric, may comprise suitable logic, circuitry, and/or code that enables reception of a DLL PDU at an ingress port 112a, selection of an egress port 112n, and transmission of the DLL PDU from the selected egress port 112n. In various embodiments of the invention, the fabric 102 may be implemented as a single integrated circuit (IC) device, or chip. The fabric 102 may comprise a controller, which determines when the DLL PDU is to be transmitted from the selected egress port 112n, and an egress port queue, which is utilized to store the DLL PDU until it is transmitted. The fabric 102 may determine a queue level for the egress port queue. The queue level may provide a measure of the number of DLL PDUs that are stored in the egress queue at a given time instant.

In various embodiments of the invention, the fabric 102 may detect congestion if the queue level is greater than a threshold value. Having detected congestion, the fabric may modify a header field in the DLL PDU to indicate that congestion was detected within the fabric 102 while processing the DLL PDU. In various embodiments of the invention, a congestion indication may be generated in an Ethernet frame by setting the canonical form indicator (CFI) field, CFI=1. In a Gigabit Ethernet frame, a congestion indication may be generated by setting the congestion experienced (CE) field, CE=1. If no congestion is detected within the fabric 102, the value for the congestion indication field within the received DLL PDU may be unchanged. The fabric 102 may subsequently transmit the DLL PDU, with the modified or unchanged header field, via the egress port 112n.

The endpoint 0 104a may comprise suitable logic, circuitry, and/or code that enables transmission of DLL PDUs and/or reception of DLL PDUs. When the endpoint 0 104a transmits DLL PDUs, it may be referred to as a source endpoint. The endpoint 1 104b may be substantially similar to the endpoint 0 104a. The endpoint N 104n may be substantially similar to the endpoint 104a. When the endpoint N 104n receives DLL PDUs, it may be referred to as a destination endpoint.

In operation, the fabric 102 may be communicatively coupled to the endpoint 0 104a, endpoint 1 104b, ..., and endpoint N 104n by a communication medium, for example category 5 unshielded twisted pair (UTP) wiring. The source endpoint 0 104a may transmit DLL PDUs to the destination endpoint N 104n by transmitting DLL PDUs to the fabric at ingress port 112a. The fabric 102 may send the received DLL PDU to the egress port 112n from where the DLL PDU may be transmitted to the destination endpoint N 104n. Similarly, the source endpoint 1 104b may transmit DLL PDUs to the destination endpoint N 104n by transmitting DLL PDUs to the fabric at ingress port 112b. The fabric 102 may send the received DLL PDU to the egress port 112n from where the DLL PDU may be transmitted to the destination endpoint N 104n. The fabric may receive DLL PDUs from the source endpoint 0 104a at a data transfer rate, $r_0$. The fabric may receive DLL PDUs from the source endpoint 1 104b at a data transfer rate, $r_1$. The fabric may transmit DLL PDUs to the destination endpoint N 104n at a data transfer rate, $r_n$. The data transfer rate, $r_n$, may correspond to a maximum data transfer rate supported by the communication medium between the fabric 102, and the endpoint N 104n. This maximum data transfer rate may be referred to as a "line rate." When the source endpoint 0 104a and source endpoint 1 104b simultaneously transmit DLL PDUs at data transfer rates of $r_0$ and $r_1$, respectively, under the condition, $r_n<r_0+r_1$, congestion may be detected at the egress port 112n as indicated by the reference label 1. When the endpoint N 104n is able to receive DLL PDUs at a reception rate, $r_c$, where $r_c<r_n$, congestion may occur at the destination endpoint N 104n as indicated by the reference label 2.

Figure 2:
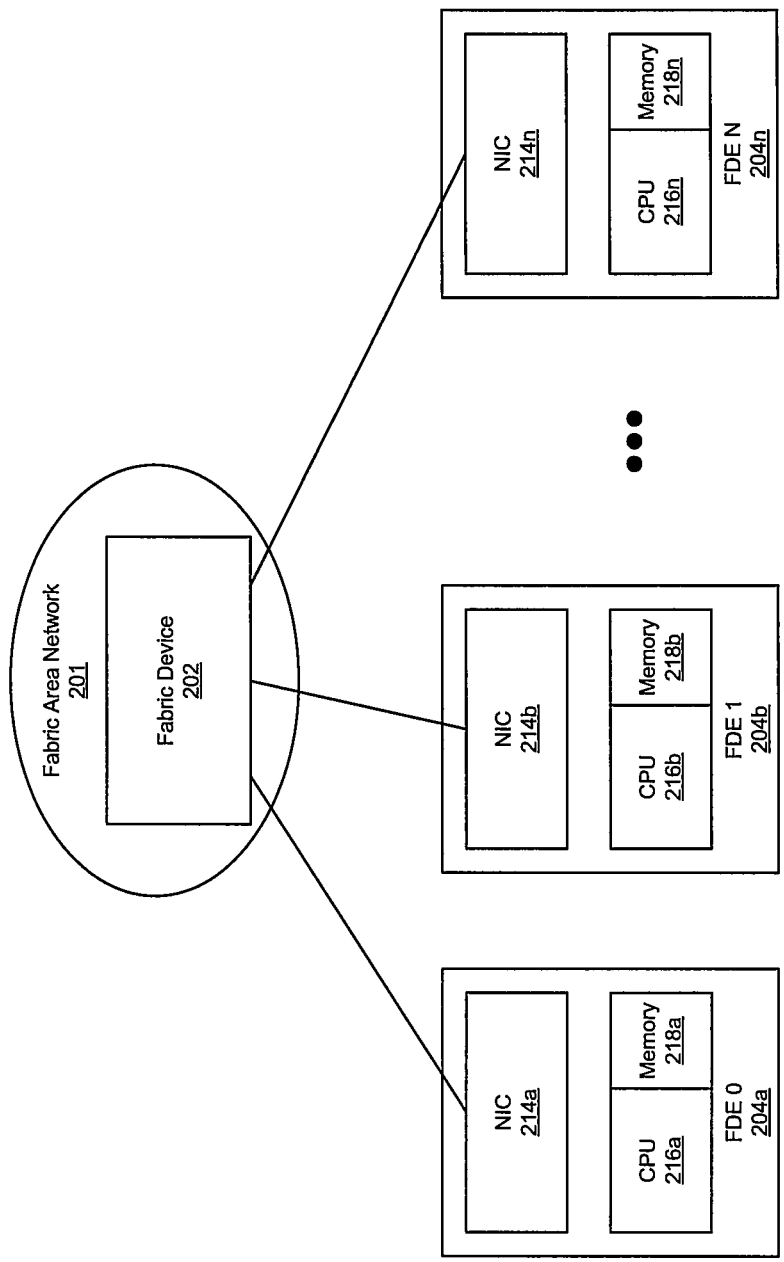
FIG. 2 is a block diagram of exemplary FAN domain endpoints (FDE) in a fabric area network (FAN) domain based on a single network interface controller (NIC) model, in accordance with an embodiment of the invention.

FIG. 2 is a block diagram of exemplary FAN domain endpoints (FDE) in a fabric area network (FAN) domain based on a single network interface controller (NIC) model, in accordance with an embodiment of the invention. Referring to FIG. 2, there is shown a fabric area network (FAN) 201, and a plurality of FAN domain endpoints (FDE), 204a, 204b, ..., 204n. The FAN 201 may comprise a fabric device 202. The fabric device 202 may be substantially similar to the fabric 102. An FDE may comprise an FDT and/or an FDR. The FDE 0 204a may comprise a network interface controller (NIC) 214a, a central processing unit (CPU) 216a, and a memory 218a. The FDE 1 204b may comprise a network interface controller (NIC) 214b, a central processing unit (CPU) 216b, and a memory 218b. The FDE N 204n may comprise a network interface controller (NIC) 214n, a central processing unit (CPU) 216n, and a memory 218n.

The FDE 0 204a may comprise suitable logic, circuitry, and/or code that enables transmission of DLL PDUs and/or reception of DLL PDUs. The NIC 214a may comprise suitable logic, circuitry, and/or code that may enable the FDE 0 204a to transmit to, and/or receive data from a network, for example, an FAN 201. Then NIC 214a may be communicatively coupled to the network via a single communications medium. The NIC 214a may enable half-duplex and/or full-duplex communication via the communications medium. In various embodiments of the invention, the NIC 214a may be implemented as a single IC device.

In various embodiments of the invention, the NIC 214a may enable the FDE 0 204a to determine whether a congestion indication is contained within a received DLL PDU. In response, a congestion notification message may be generated and transmitted by the NIC 214a. The NIC 214a may also enable the FDE 0 204a to receive a congestion notification message and increase or decrease a rate of data transmission based on the contents of the congestion notification message.

The CPU 216a may comprise suitable logic, circuitry, and/or code that may be utilized to control the operation of the FDE 0 204a, and/or execute application code, for example, a database application, which may be utilized to send and/or retrieve data via a network. The CPU 216a may perform protocol processing when sending and/or retrieving data via the network. The protocol processing may be associated with an upper layer protocol, for example, the transmission control protocol (TCP), the user datagram protocol (UDP), or the real-time transport protocol (RTP). In addition, the CPU 216a may enable execution of code, such as VMware, then enables protocol processing to be performed in a virtual machine environment.

The memory 218a may comprise suitable logic, circuitry, and/or code that may be utilized to store and/or retrieve information, data, and/or code. The memory 218a may comprise any of a plurality of memory technologies, such as dynamic random access memory (DRAM) technologies.

The FDE 1 204b may be substantially similar to the FDE 0 204a. The NIC 214b may be substantially similar to the NIC 214a. The CPU 216b may be substantially similar to the CPU 216a. The memory 218b may be substantially similar to the memory 218a. The FDE N 204n may be substantially similar to the FDE 0 204a. The NIC 214n may be substantially similar to the NIC 214a. The CPU 216n may be substantially similar to the CPU 216a. The memory 218n may be substantially similar to the memory 218a.

In operation, the FDE 0 204a may be communicatively coupled to the FAN 201 by a single connection via a single communications medium. The single connection may communicatively couple the NIC 214a to the fabric device 202. The NIC 214a may be uniquely identified to the FAN 201 based on a unique physical medium access control (MAC) address associated with the NIC 214a. Correspondingly, the unique physical MAC address may also be associated with the FDE 0 204a. In a virtual machine environment, the CPU 216a may execute code that enables the FDE 0 204a hardware to be partitioned such that the single physical FDE 0 204a may be associated with a plurality of virtual FDEs, where each virtual FDE comprises functionality, and utilizes a portion of the physical resources, associated with the physical FDE 0 204a. In the virtual machine environment, each virtual FDE may be associated with a virtual MAC address. The plurality of virtual MAC addresses may in turn be associated with the single physical MAC address.

In operation, the FDE 1 204b may be communicatively coupled to the FAN 201 by a single connection via a single communications medium. The operation of the FDE 1 204b may be substantially similar to that of the FDE 0 204a. The operation of the NIC 214b may be substantially similar to the NIC 214a. The operation of the NIC 315b may be substantially similar to the NIC 314a. The operation of the CPU 216b may be substantially similar to the CPU 216a.

In operation, the FDE N 204n may be communicatively coupled to the FAN 201 by a single connection via a single communications medium. The operation of the FDE N 204n may be substantially similar to that of the FDE 0 204a. The operation of the NIC 214n may be substantially similar to the NIC 214a. The operation of the NIC 315b may be substantially similar to the NIC 314a. The operation of the CPU 216n may be substantially similar to the CPU 216a.

The FDE 0 204a may be a source endpoint that transmits DLL PDUs to the fabric device 202 via the NIC 214a. The destination endpoint for the transmitted DLL PDUs may be the FDE N 204n. The DLL PDUs may be transmitted at an data transfer rate $r_0$. The fabric device 202 may receive the DLL PDUs from the FDE 0 204a and transmit them to the FDE N 204n. The FDE N 204n may be a destination endpoint that receives the DLL PDUs from the fabric device 202 via the NIC 214n.

When the fabric device 202 detects congestion in the path from the FDE 0 204a to the FDE N 204n, the fabric device 202 may modify the DLL PDU header to indicate that congestion was detected within the fabric device 202 while processing the DLL PDU. NIC 214n may enable the FDE N 204n to determine whether a congestion indication is contained within a DLL PDU received from the fabric device 202. In response, the NIC 214n may enable generation of a congestion notification message, which may be transmitted to the FDE 0 204a via the fabric device 202. The NIC 214a may enable the FDE 0 204a to receive the congestion notification message and to modify the data transfer rate in response. For example, when the congestion notification message comprises a rate decrease request, the FDE 0 204a may transmit subsequent DLL PDUs to the FDE N 204n at a data transfer rate, $r_0'$, where $r_0'<r_0$.

Figure 3:
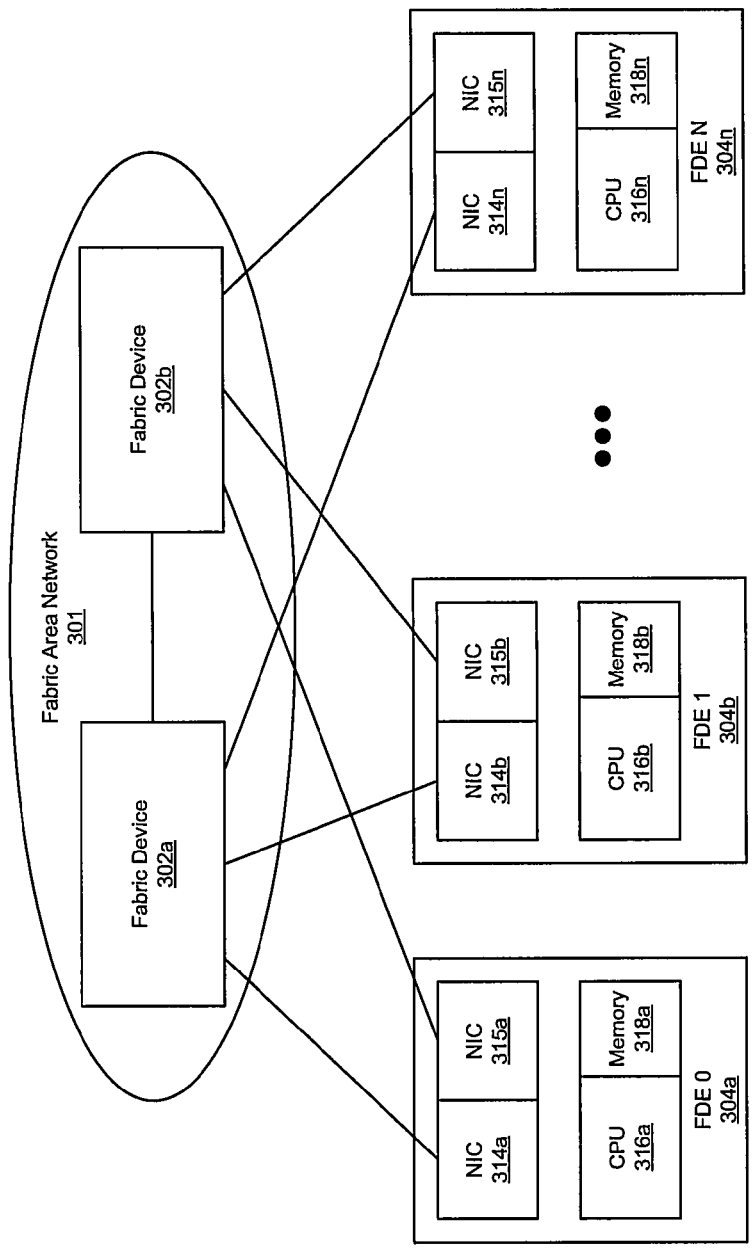
FIG. 3 is a block diagram of exemplary FAN domain endpoints (FDE) in a fabric area network (FAN) domain based on a multiple network interface controller (NIC) model, in accordance with an embodiment of the invention.

FIG. 3 is a block diagram of exemplary FAN domain endpoints (FDE) in a fabric area network (FAN) domain based on a multiple network interface controller (NIC) model, in accordance with an embodiment of the invention. Referring to FIG. 3, there is shown a fabric area network (FAN) 301, and a plurality of FAN domain endpoints (FDE), 304a, 304b, . . . , 304n. The FAN 301 may comprise a plurality of fabric devices 302a and 302b. The fabric device 302a may be substantially similar to the fabric 102. The fabric device 302b may be substantially similar to the fabric device 302a. The FDE 0 304a may comprise a plurality of NICs 314a and 315a, a central processing unit (CPU) 316a, and a memory 318a. The FDE 1 304b may comprise a plurality of NICs 314b and 315b, a central processing unit (CPU) 316b, and a memory 318b. The FDE N 304n may comprise a plurality of NICs 314n and 315n, a central processing unit (CPU) 316n, and a memory 318n.

The FDE 0 304a may be substantially similar to the FDE 204a. The NIC 314a may be substantially similar to the NIC 214a. The NIC 315a may be substantially similar to the NIC 314a. The CPU 316a may be substantially similar to the CPU 216a. The memory 318a may be substantially similar to the memory 218a.

The FDE 1 304b may be substantially similar to the FDE 304a. The NIC 314b may be substantially similar to the NIC 314a. The NIC 315b may be substantially similar to the NIC 315a. The CPU 316b may be substantially similar to the CPU 316a. The memory 318b may be substantially similar to the memory 318a.

The FDE N 304n may be substantially similar to the FDE 304a. The NIC 314n may be substantially similar to the NIC 314a. The NIC 315n may be substantially similar to the NIC 315a. The CPU 316n may be substantially similar to the CPU 316a. The memory 318n may be substantially similar to the memory 318a.

In operation, the FDE 0 304a may be communicatively coupled to the FAN 301 by a plurality of connections via a corresponding plurality of communications media. One of the connections may communicatively couple the NIC 314a to the fabric device 302a. Another connection may communicatively couple the NIC 315a to the fabric device 302b. The NIC 314a within the FDE 0 304a may be uniquely identified to the FAN 301 based on a unique physical MAC address associated with the NIC 314a. The NIC 315a may utilize a different unique physical MAC address from that of the NIC 314a. The CPU 316a may enable a first group of virtual MAC addresses to be associated with the unique physical address MAC associated with the NIC 315a. The CPU 316a may enable a second group of virtual MAC address to be associated with the unique physical MAC address associated with the NIC 315a.

In operation, the FDE 1 304b may be communicatively coupled to the FAN 301 by a plurality of connections via a corresponding plurality of communications media. One of the connections may communicatively couple the NIC 314b to the fabric device 302a. Another connection may communicatively couple the NIC 315b to the fabric device 302b. The operation of the FDE 1 304b may be substantially similar to that of the FDE 0 304a. The operation of the NIC 314b may be substantially similar to the NIC 314a. The operation of the NIC 315b may be substantially similar to the NIC 314a. The operation of the CPU 316b may be substantially similar to the CPU 316a.

In operation, the FDE N 304*n* may be communicatively coupled to the FAN 301 by a plurality of connections via a corresponding plurality of communications media. One of the connections may communicatively couple the NIC 314*n* to the fabric device 302*a*. Another connection may communicatively couple the NIC 315*n* to the fabric device 302*b*. The operation of the FDE N 304*n* may be substantially similar to that of the FDE 0 304*a*. The operation of the NIC 314*n* may be substantially similar to the NIC 314*a*. The operation of the NIC 315*n* may be substantially similar to the NIC 314*n*. The operation of the CPU 316*n* may be substantially similar to the CPU 316*a*.

The fabric device 302*a* may be communicatively coupled to the fabric device 302*b* via a communications medium. The fabric device 302*a* and fabric device 302*b* may be referred to as being cross-connected.

The FDE 0 304*a* may be a source endpoint that transmits DLL PDUs to the FAN 301 via the NIC 314*a* and/or the NIC 315*a*. In an active-standby mode of operation, for example, the FDE 0 304*a* may transmit DLL PDUs to the fabric device 302*a* via an active mode NIC 314*a* while not transmitting DLL PDUs to the fabric device 302*b* via a standby mode NIC 315*a*. In an active-active mode of operation, the FDE 0 304*a* may transmit DLL PDUs to the fabric device 302*a* via the active mode NIC 314*a*, while also transmitting DLL PDUs to the fabric device 302*b* via the active mode NIC 315*a*.

The FDE N 304*a* may be a destination endpoint that receives DLL PDUs from the FAN 301 via the NIC 314*n* and/or the NIC 315*n*. In an active-standby mode of operation, for example, the FDE N 304*n* may receive DLL PDUs from the fabric device 302*a* via an active mode NIC 314*n* while not receiving DLL PDUs from the fabric device 302*b* via a standby mode NIC 315*a*. In an active-active mode of operation, the FDE N 304*n* may receive DLL PDUs from the fabric device 302*a* via the active mode NIC 314*n*, while also receiving DLL PDUs from the fabric device 302*b* via the active mode NIC 315*n*.

Because each NIC may comprise a unique physical MAC address, the source endpoint may specify one of a plurality of NICs, which is to be utilized for transmitting DLL PDUs, while the destination endpoint may be specified based on a unique physical MAC address associated with one of a plurality of NICs located at the destination endpoint FDE. For example, the source endpoint FDE 0 304*a* may transmit DLL PDUs to the fabric device 302*a* via the NIC 314*a*. The destination endpoint for the DLL PDUs may be the NIC 314*n* within the FDE N 304*n*. The source endpoint FDE 0 304*a* may transmit DLL PDUs via the NIC 314*a* to the destination endpoint NIC 315*n* within the FDE N 304*n*. The NIC 314*a* may transmit DLL PDUs to the fabric device 302*a*. The fabric device 302*a* may transmit the DLL PDUs to the fabric device 302*b* via the cross-connection between the fabric devices. The fabric device 302*b* may transmit the DLL PDUs to the destination endpoint NIC 315*n* within the FDE N 304*n*.

The fabric 302*a* may detect congestion substantially similar to the method utilized for the fabric 202. The fabric 302*b* may detect congestion substantially similar to the method utilized for the fabric 302*a*. A destination endpoint NIC 315*n* may detect a congestion indication within a received DLL PDU substantially similar to the method utilized for the NIC 214*n*. In response, to detection of a congestion indication, the NIC 315*n* may generate and transmit a congestion notification message substantially similar to the method utilized for the NIC 214*n*. A NIC 314*a* may receive a congestion notification messages and modify a data transfer rate in response substantially similar to the method utilized by the NIC 214*a*.

Figure 4:
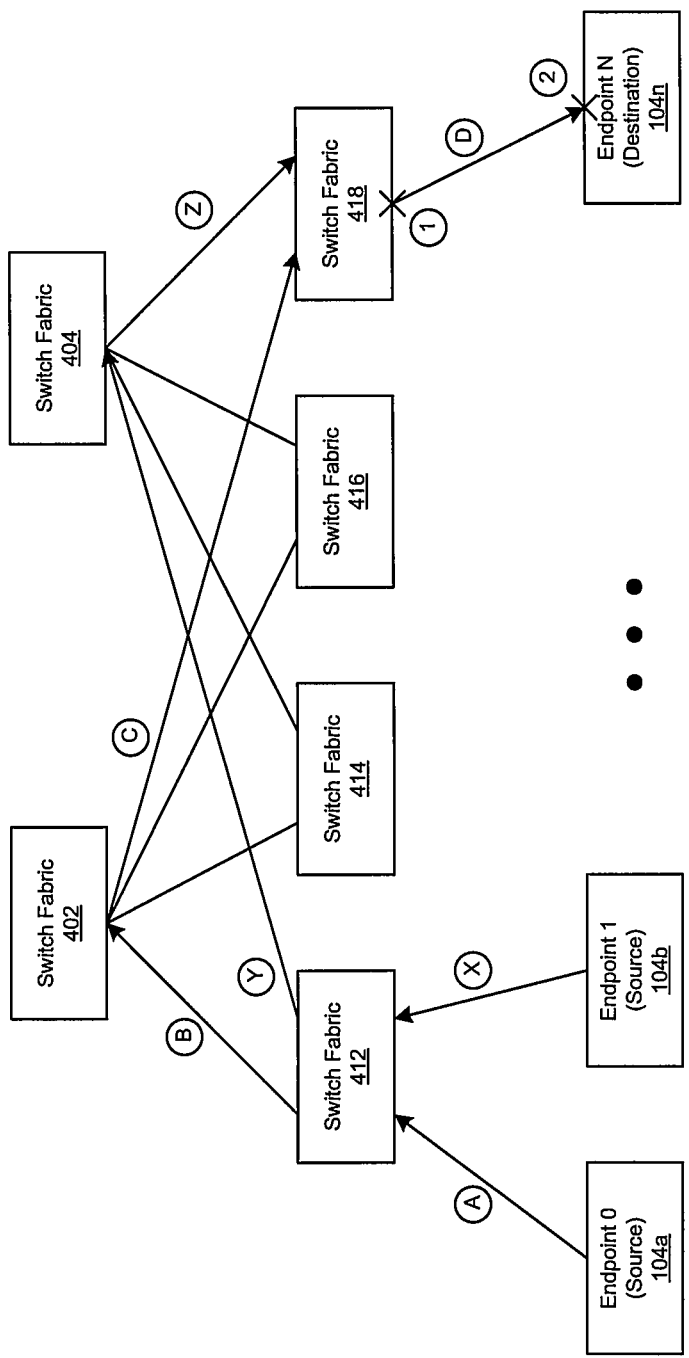
FIG. 4 is a block diagram of an exemplary multistage FAN domain, in accordance with an embodiment of the invention.

FIG. 4 is a block diagram of an exemplary multistage FAN domain, in accordance with an embodiment of the invention. Referring to FIG. 4, there is shown a plurality of first stage switch fabrics 402 and 404, a plurality of second stage switch fabrics 412, 414, 416, and 418, and a plurality of endpoints: endpoint 0 104*a*, endpoint 1 104*b*, . . . , and endpoint N 104*n*. Each of the plurality of endpoints is described with regard to FIG. 1.

Each of the plurality of first stage switch fabrics 402 and 404 may be substantially similar to the switch fabric 102. Each of the plurality of second stage switch fabrics 412, 414, 416, and 418 may be substantially similar to the switch fabric 102.

In operation, the fabric 412 may be communicatively coupled to the endpoint 0 104*a*, the endpoint 1 104*b*, the switch fabric 402, and the switch fabric 404. The fabric 414 may be communicatively coupled to the switch fabric 402, and the switch fabric 404. The fabric 416 may be communicatively coupled to the switch fabric 402, and the switch fabric 404. The fabric 418 may be communicatively coupled to the endpoint N 104*n*, the switch fabric 402, and the switch fabric 404.

The source endpoints 104*a* and 104*b* may each transmit DLL PDUs to the destination endpoint N 104*b*. DLL PDUs transmitted by the source endpoint 104*a* may follow a multi-segment path as indicated by the reference labels A, B, C, and D. The reference label A may refer to a path segment between the endpoint 0 104*a*, and the switch fabric 412. The reference label B may refer to a path segment between the second stage switch fabric 412, and the first stage switch fabric 402. The reference label C may refer to a path segment between the first stage switch fabric 402, and the second stage switch fabric 418. The reference label D may refer to a path segment between the switch fabric 418 and the endpoint N 104*n*.

DLL PDUs transmitted by the source endpoint 104*b* may follow a multi-segment path as indicated by the reference labels X, Y, Z, and D. The reference label X may refer to a path segment between the endpoint 1104*b*, and the switch fabric 412. The reference label Y may refer to a path segment between the second stage switch fabric 412, and the first stage switch fabric 404. The reference label Z may refer to a path segment between the first stage switch fabric 404, and the second stage switch fabric 418. The reference label D may refer to a path segment between the switch fabric 418 and the endpoint N 104*n*.

When the source endpoint 0 104*a* and source endpoint 1 104*b* simultaneously transmit DLL PDUs, congestion may be detected at the switch fabric 418, which transmits the aggregate traffic from the endpoints 104*a* and 104*b* to the endpoint 104*n* via the path segment D, as illustrated by the reference label 1. As described in FIG. 1, congestion may also be detected at the destination endpoint N 104*n*, as illustrated by the reference label 2.

As illustrated in the single stage FAN in FIG. 1, an exemplary path from a source endpoint 104*a* to a destination endpoint 104*n*, may comprise 2 segments. As illustrated in the multi-stage FAN in FIG. 4, an exemplary-path from a source endpoint 104*a* to a destination endpoint 104*n* may comprise 4 segments. As a result of the greater number of path segments, end-to-end latency from the source to the destination may be greater in the multi-stage FAN as illustrated in FIG. 4, than in the single stage FAN, as illustrated in FIG. 1. This may also indicate that it may take longer to detect and respond to congestion conditions based on end-to-end congestion detection and congestion notification methods as the number of FAN stages increases. This may also indicate that a useful level of granularity for managing congestion within FANs may be based on each individual path within the FAN. Consequently, it may become more important to utilize methods that enable detecting congestion conditions early, and responding to those conditions before congestion develops within the FAN that may result in discarded packets.

Various embodiments of the invention comprise a method and system by which congestion is monitored based on traffic management queues (TMQs). The TMQ may be associated with a FAN flow, where a FAN flow may refer to DLL PDUs transmitted between a source endpoint and a destination endpoint. A TMQ may be identified based on an FDR index, a priority level, or priority group (PG), and a path index. An FDR index may indicate a destination endpoint. An FDR index may be associated with an NIC, and/or a physical MAC address, at the destination endpoint. A PG may indicate a relative transmission level, or importance, among DLL PDUs transmitted via the FAN 301. A path index may identify a multi-segment path from the source endpoint to the destination endpoint through the FAN 301. A FAN flow may be identified based on the FDR index, the PG, the path, and an FDT index. The FDT index may indicate a source endpoint. An FDT index may be associated with an NIC, and/or a physical MAC address, at the source endpoint.

Each DLL PDU transmitted through a FAN 301 may be associated with a TMQ. Each fabric device 302a may detect a queue level for DLL PDUs associated with an egress port. Based on the detected queue level, the fabric device 302a may modify a header field within a DLL PDU when the detected queue level indicates that congestion avoidance should be practiced. The modified header field may be utilized at a destination endpoint FDE N 304n to determine whether a congestion notification message should be transmitted to the source endpoint in reference to DLL PDUs associated with the indicated FAN flow. If a congestion notification message is transmitted to the source endpoint, the FAN flow may be indicated within the message. Based on receipt of the congestion notification message, the source endpoint may modify a data transmission rate for DLL PDUs associated with the corresponding TMQ.

Figure 5:
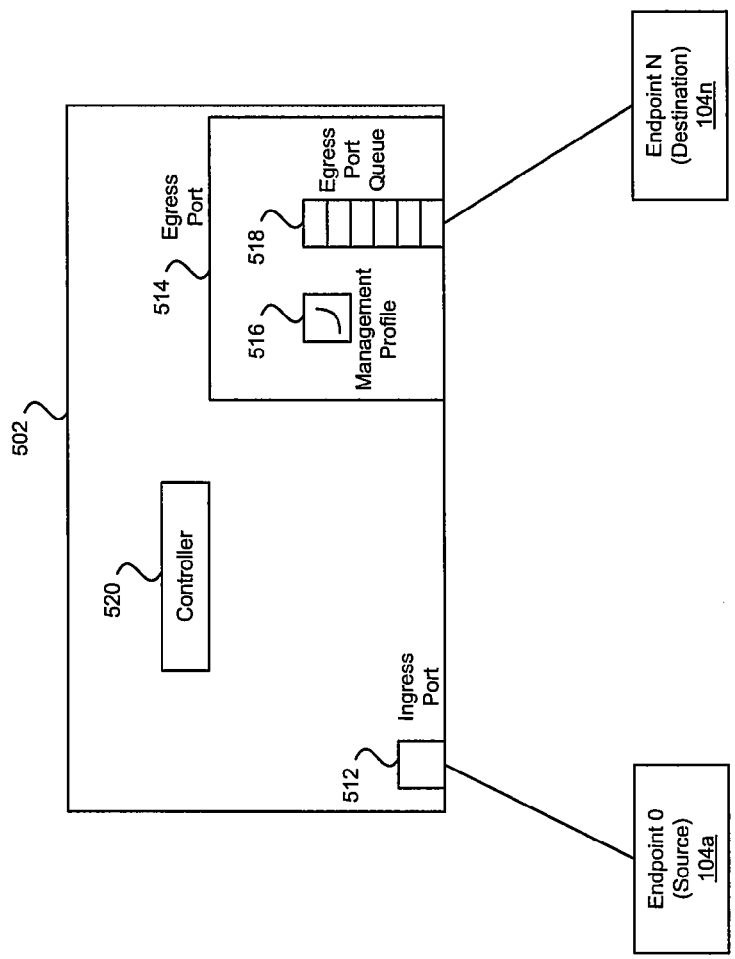
FIG. 5 is a block diagram of an exemplary switch fabric, in accordance with an embodiment of the invention.

FIG. 5 is a block diagram of an exemplary switch fabric, in accordance with an embodiment of the invention. Referring to FIG. 5, there is shown a switch fabric 502, a source endpoint 104a, and a destination endpoint 104n. The switch fabric 502 may comprise an ingress port 512, and egress port 514, and a controller 520. The egress port 514 may comprise a management profile 516, and an egress port queue 518. The source endpoint 104a, and destination endpoint 104n are as described in FIG. 1. The switch fabric 502 may be substantially similar to the switch fabric 102 (FIG. 1).

The ingress port 512 may comprise suitable logic, circuitry, and/or code that may enable reception of DLL PDUs via a communications medium. An exemplary NIC may comprise an ingress port 512. The egress port 514 may comprise suitable logic, circuitry, and/or code that may enable transmission of DLL PDUs via a communications medium. An exemplary NIC may comprise an egress port 514. The controller 520 may comprise suitable logic, circuitry, and/or code that may enable transfer of a DLL PDU received at an ingress port 512, to an egress port 514. The controller 520 may also send control signals to the egress port 514 that enable the queuing of received DLL PDUs, and scheduling for transmission of queued DLL PDUs.

The egress port queue 518 may comprise suitable logic, circuitry, and/or code that may enable storage of received DLL PDUs pending scheduling of transmission from the egress port 514. The queue level within the egress port queue 518 may be detected at a given time instant.

The management profile 516 may enable determination of a threshold queue level at which congestion avoidance methods may be practiced. The queue level may be referred to as a load, and a threshold queue level may be referred to as $Load_{Target}$.

Figure 6:
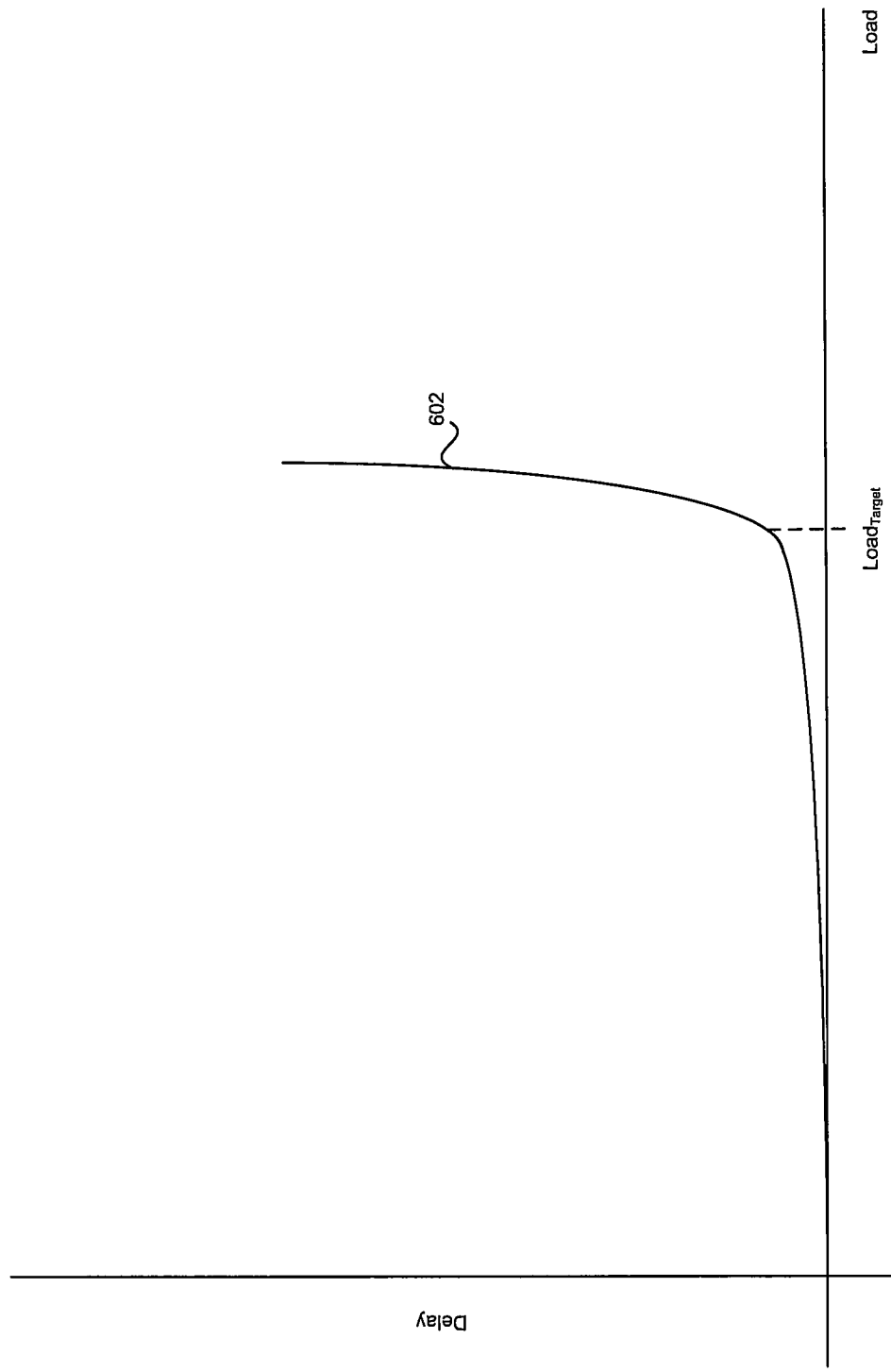
FIG. 6 is an exemplary graph illustrating end-to-end delay versus load, which may be utilized in connection with an embodiment of the invention.

FIG. 6 is an exemplary graph illustrating end-to-end delay versus load, which may be utilized in connection with an embodiment of the invention. Referring to FIG. 6, there is shown a delay profile 602. The delay profile 602 may indicate a delay, or latency, as measured in milliseconds (ms), for example, which measures a time duration beginning at a time instant at which a source endpoint 104a transmits a DLL PDU, and ending at a time instant at which a destination endpoint 104n receives the DLL PDU. The load indicated in the delay profile 602 may refer to a queue level within an egress port queue 518 within a switch fabric 502. As indicated by the delay profile 602, the delay may increase with increasing values for the load. For values of load that are less than the indicated level, $Load_{Target}$, the delay may increase slowly. For value of load that are greater than the level $Load_{Target}$ the delay may increase rapidly. The level $Load_{Target}$ may represent a target load level for efficient operation of a switch fabric 502.

In various embodiments of the invention, a management profile 516 may be based on an exemplary delay profile 602 from which a threshold queue level $Load_{Target}$ may be determined. Based on the threshold queue level, the egress port 514 may modify a header field within a DLL PDU to indicate congestion. In various embodiments of the invention, the end-to-end latency may be maintained within a desirable range by managing the queue level in the egress port queue 518. As a result, a switch fabric 502 may be able to avoid occurrences of congestion that may lead to discarded packets. Furthermore, by limiting the end-to-end latency, a FAN 301 may be able to respond more rapidly to congestion conditions that may occur.

Figure 7:
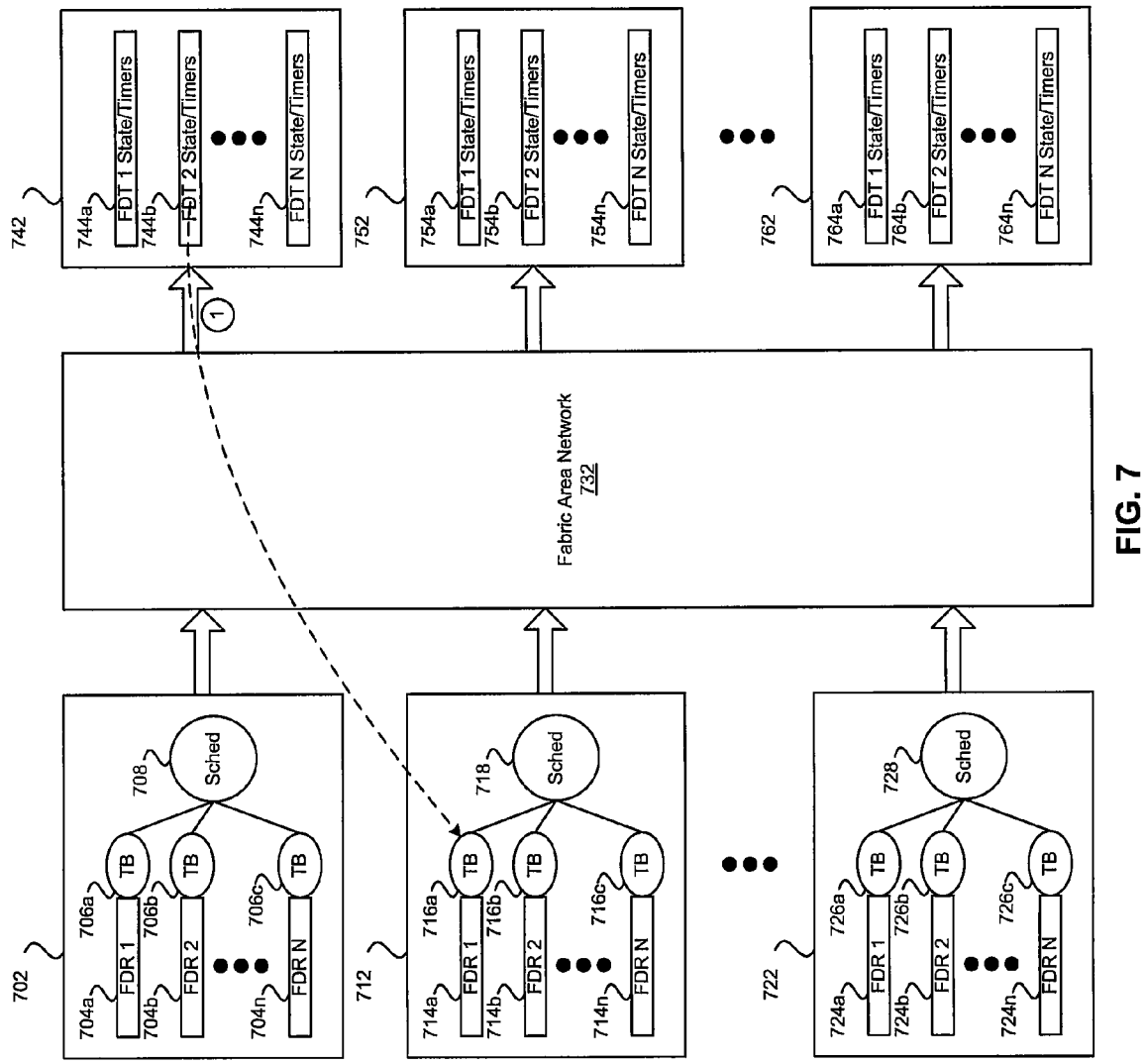
FIG. 7 is a block diagram illustrating exemplary granularity for traffic queue management and congestion avoidance, in accordance with an embodiment of the invention.

FIG. 7 is a block diagram illustrating exemplary granularity for traffic queue management and congestion avoidance, in accordance with an embodiment of the invention. Referring to FIG. 7, there is shown an FDT 1 702, an FDT 2 712, . . . , and an FDT N 722, a fabric area network (FAN) 732, an FDR 1 742, an FDR 2 752, . . . , and an FDR N 762.

The FDT 1 702 may comprise a plurality of TMQs 704a, 704b, . . . , and 704n, a corresponding plurality of token bucket (TB) blocks 706a, 706b, . . . , and 706n, and a scheduler 708. The FDT 2 712 may comprise a plurality of TMQs 714a, 714b, . . . , and 714n, a corresponding plurality of token bucket (TB) blocks 716a, 716b, . . . , and 716n, and a scheduler 718. The FDT N 722 may comprise a plurality of TMQs 724a, 724b, . . . , and 724n, a corresponding plurality of token bucket (TB) blocks 726a, 726b, . . . and 726n, and a scheduler 728.

The FDR 1 742 may comprise a plurality of state/timer blocks 744a, 744b, . . . , and 744n. The FDR 2 752 may comprise a plurality of state/timer blocks 754a, 754b, . . . , and 754n. The FDR N 762 may comprise a plurality of state/timer blocks 764a, 764b, . . . , and 764n.

The FDT 1 702, FDT 2 712, . . . , and FDT N 722 may each maintain TMQs where the granularity of the TMQs may be an individual FDR, for example. The TMQ 714a may represent a TMQ for DLL PDUs transmitted from the FDT 2 712 to the FDR 1 742, for example. Associated with each individual TMQ, the FDT 1 702, FDT 2 712, . . . , and FDT N 722 may each comprise a TB block, for example. Each TB block may utilize a token bucket algorithm to shape DLL PDU traffic transmitted from the corresponding TMQ. The TB block may define an average data rate at which DLL PDU traffic may be transmitted. In addition, the TB block may define a burst duration, which represents a time duration for which DLL PDU traffic may be transmitted at data rates that exceed the average data rage. The TB block 716a may shape DLL PDU traffic transmitted from the TMQ 714a for which the destination endpoint may be the FDR 742.

The FDT 1 702, FDT 2 712, ..., and FDT N 722 may each maintain a scheduler block. Each scheduler block may perform traffic shaping on the aggregate DLL PDU traffic transmitted from each of the TMQs within an FDT. For example, the scheduler block may ensure that the aggregated data rate for DLL PDU traffic from the group of TMQs associated with an FDT does not exceed a specified data rate. The scheduler 718 may perform the scheduler function within the FDT 712. The scheduler may perform traffic shaping on DLL PDUs transmitted from the FDT 712 for which the destination endpoint is one or more of the FDRs 742, 752, ..., and/or 762.

In another exemplary embodiment of the invention, the FDT 2 712 may comprise a plurality of TMQs for DLL PDUs transmitted from the FDT 2 712 to the FDR 1 742. For example, if the FDT 2 712 utilizes 3 distinct PGs for transmitted DLL PDUs, and may select from among 4 paths through the FAN 732, there may be 3*12=12 TMQs for DLL PDUs transmitted from the FDT 2 712 to the FDR 1 742. In this case, the granularity of the TMQs would be an individual FAN flow.

Each of the state/timer blocks within each of the FDRs may comprise information about the congestion state of a corresponding FAN flow. For example, the state/timer block 744b may comprise congestion state information related to the TMQ 714a. An FDR may determine whether to transmit a congestion notification message to an FDT based on the congestion indication within the received DLL PDU, and based on the congestion state information within a state/timer block.

In operation, the FDT 2 712 may transmit a DLL PDU from the TMQ 714a via the FAN 732. The destination endpoint for the transmitted DLL PDU may be the FDR 1 742. As the DLL PDU is transported along a path via the FAN 732 to the destination endpoint, each switch fabric within the FAN 732 may determine whether a queue level for an egress port queue along the path has exceeded a threshold level indicating that a congestion avoidance procedure should be practiced. If this occurs along the path, the switch fabric within the FAN 732 that detected the condition may modify a field in the header of the DLL PDU. The modification may comprise setting CFI=1, and/or setting CE=1.

Upon receipt of the DLL PDU, the FDR 1 742 may determine the FDT index for the source endpoint, FDT 2 712, based on information contained within the DLL PDU header when the FDT 2 712 comprises a single NIC. If the FDT 2 712 comprises multiple NICs, the FDR 1 742 may determine the FDT index based on a mapping, or hash, table that maps physical MAC addresses to corresponding FDT indexes. In this exemplary case, determination of the FDT index may comprise sufficient information that allows the FDR 1 742 to identify a FAN flow.

In another exemplary embodiment of the invention, the FDR 1 724 may determine the PG based on information contained within the DLL PDU header. The path index may be computed based on a hash table, such as may be utilized within the FAN 732 to determine a path through the FAN for delivery of the DLL PDU to the destination endpoint.

After identifying a FAN flow, the FDR 1 742 may identify a corresponding state/timer block 744b for the DLL PDU traffic received from the FDT 2 712. If the DLL PDU comprises a header field CFI=1 and/or CE=1, the FDR 1 742 may update information contained within the state/timer block 744b. Based on current information in the state/timer block 744b, the FDR 1 742 may transmit a congestion notification message to the FDT 2 712, as illustrated by the reference label 1. The congestion notification message may comprise information that enables the FDT to identify a FAN flow, and the corresponding TMQ 714a associated with the FAN flow. For example, the congestion notification message may comprise an FDT index, and an FDR index. The congestion notification message may also comprise a rate modification request, for example, a request that the FDT 2 712 decrease the data transfer rate for transmitted DLL PDUs from the TMQ 714a.

In another exemplary embodiment of the invention, the congestion notification message may comprise the FDT index, the FDR index, a PG, a path index, and the rate modification request.

Figure 8:
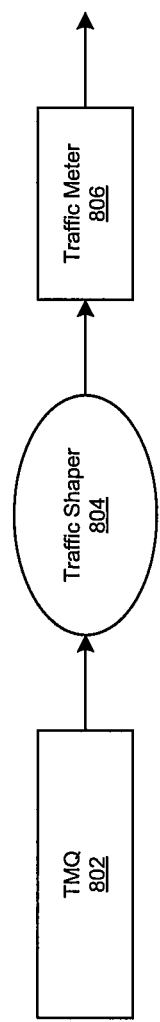
FIG. 8 is a block diagram of an exemplary traffic management queue (TMQ) rate control mechanism, in accordance with an embodiment of the invention.

FIG. 8 is a block diagram of an exemplary traffic management queue (TMQ) rate control mechanism, in accordance with an embodiment of the invention. Referring to FIG. 8, there is shown a TMQ 802, a traffic shaper block 804, and a traffic meter block 806. The TMQ 802 may be substantially similar to the TMQ 714a. The traffic shaper block 804 may be substantially similar to the TB block 716a. The traffic meter block 806 may respond to received congestion notification messages to enable adjustment of the data transfer rate for DLL PDUs based on the rate modification request. For example, when a rate modification rate request requests a data rate decrease the traffic meter block 806 may modify traffic shaping parameters utilized by the traffic shaper block 804 to enable a decrease in the data transfer rate for DLL PDUs transmitted from the TMQ 802. When a rate modification request requests a data rate increase, the traffic meter block 806 may modify traffic shaping parameters utilized by the traffic shaper block 804 to enable an increase in the data transfer rate for DLL PDUs transmitted from the TMQ 802.

Figure 9:
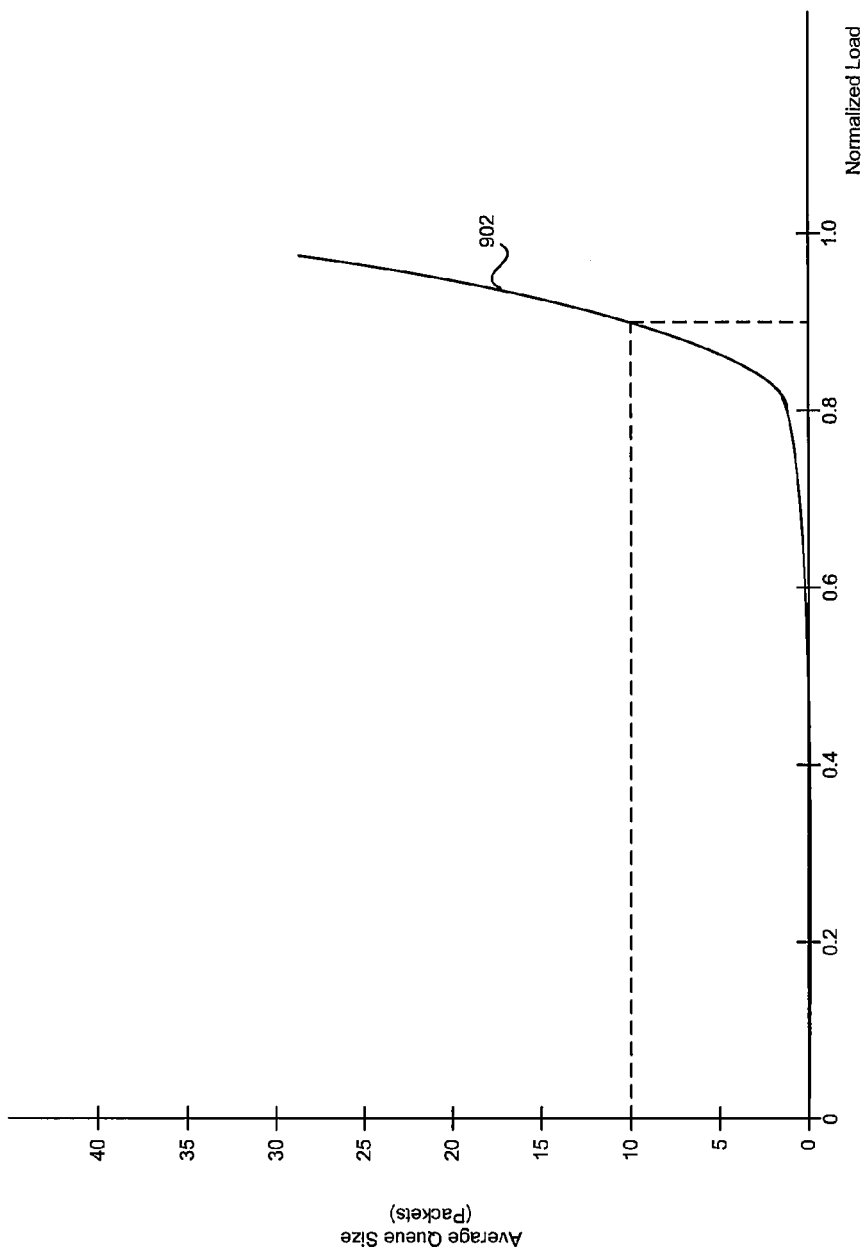
FIG. 9 is a graph illustrating exemplary load versus average queue size, which may be utilized in connection with an embodiment of the invention.

FIG. 9 is a graph illustrating exemplary load versus average queue size, which may be utilized in connection with an embodiment of the invention. Referring to FIG. 9, there is shown an average queue size profile 902. The average queue size may be measures in units of packets, and may vary based on normalized load within an egress port queue 518. The normalizing factor may be equal to the capacity of the egress port queue 518. For example, when the normalized load is about equal to 0.9, or 90%, the average queue size may be about 10 packets. In various embodiments of the invention, the average queue size may provide a measure of congestion within an egress port 514. If a queue level threshold is set to be 10 packets based on the average queue size profile 902, a switch fabric 502 may practice congestion avoidance methods when a queue level within an egress port queue 518 exceed 10 packets.

In various embodiments of the invention, other exemplary criteria may be utilized for determining whether to utilize congestion avoidance methods. For example, congestion avoidance methods may be utilized based on a time period during which the queue level may be continuously greater than 0. Congestion avoidance methods may be utilized based on an instantaneous queue length, or based on a rate of queue length increase, or based on a rate of change in the rate of queue length increase. Alternatively, congestion avoidance methods may be utilized based on a computed pricing measure. An exemplary pricing measure may be a function of an input rate to an egress queue relative to an egress rate from the egress queue. The relative comparison may be compared to a target threshold.

In an exemplary embodiment of the invention, the average queue size may be computed based on an exponentially weighted moving average (EWMA) from observations of instantaneous queue size levels at distinct time instants. An exemplary equation for computation of the average queue size may be represented as illustrated in the following equation:

$$Q_{avg}(t)=(1-W_q)\times Q_{avg}(t-1)+Q_{inst}(t)\times W_q \qquad \text{Equation [1]}$$

where $W_q$ may represent a weighting factor, $Q_{inst}(t)$ may represent an instantaneous queue size at a time instant t, $Q_{inst}(t)$ may represent a computed average queue size at a current time instant t, and $Q_{avg}(t-1)$ may represent a computed average queue size at a time instant t−1, which precedes the current time instant.

In various embodiments of the invention, a marking profile may be utilized to determine which DLL PDUs among a group of candidate DLL PDUs that may be eligible for congestion indication marking. This may occur when the fabric 502 determines, based on one or more criteria such as described above, that congestion indication is to be indicated in at least a portion of DLL PDUs transmitted from an egress port 514. The marking profile may indicate a congestion indication marking probability that may be utilized to determine the probability that a DLL PDU, which is eligible for congestion indication marking, is actually marked, by setting the CFI=1 and/or CE=1 for example. The congestion indication marking probability may be a function of the average queue size, for example.

Figure 10:
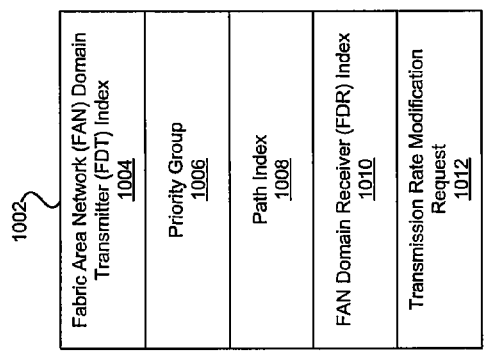
FIG. 10 is a diagram of an exemplary congestion notification message, in accordance with an embodiment of the invention.

FIG. 10 is a diagram of an exemplary congestion notification message, in accordance with an embodiment of the invention. Referring to FIG. 10, there is shown a congestion notification message 1002. The congestion notification message 1002 may comprise a FDT index 1004, a PG 1006, a path index 1008, a FDR index 1010, and a transmission rate modification request 1012. The congestion notification message 1002 may be generated by an FDR 1 742 and transmitted to an FDT 2 712.

Figure 11:
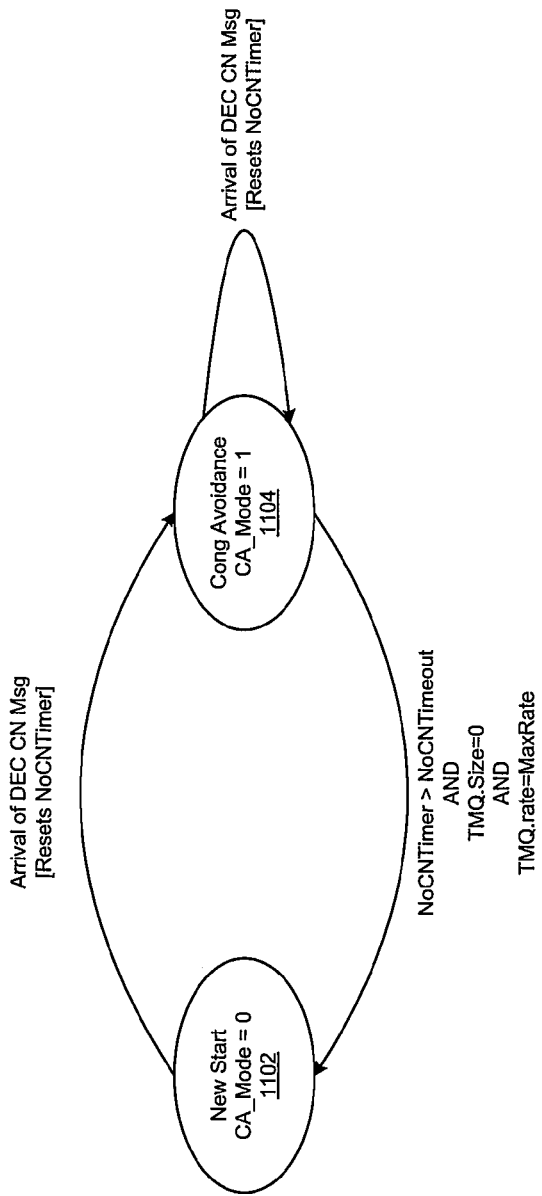
FIG. 11 is a diagram of an exemplary congestion avoidance state machine, in accordance with an embodiment of the invention.

FIG. 11 is a diagram of an exemplary congestion avoidance state machine, in accordance with an embodiment of the invention. The congestion avoidance state machine may be utilized by a FDT 2 712 to control a rate at which DLL PDUs are transmitted via a FAN flow. For example, in the exemplary system for traffic queue management as illustrated in FIG. 7, the FDT 2 712 may maintain a congestion avoidance state machine for each of the FDRs 742, 752, . . . , and 762. The congestion avoidance state machine may be utilized by a traffic meter block 806 for determining values for parameters that may be communicated to the traffic shaper block 804.

The congestion avoidance state machine may utilize a plurality of state variables and/or timers. A congestion avoidance mode variable, CA_Mode, may indicate whether congestion is detected in the corresponding FAN flow. For example, the value CA_Mode=0 may represent a first congestion state. This first congestion state may indicate no congestion. The value CA_Mode=1 may represent a second congestion state. The second congestion state may indicate congestion. A congestion notification timer, NoCNTimer, may measure a time duration following receipt of a last congestion notification message. The congestion notification timer value may be compared to a timeout value, NoCNTimeout. A decrease wait timer, MinDecreaseWaitTimer, may measure a time duration following a last decrease in a rate for transmitting DLL PDUs. The decrease wait timer value may be compared to a minimum decrease wait time value, MinDecreaseWait. An increase wait timer, MinIncreaseWaitTimer, may measure a time duration following a last increase in a rate for transmitting DLL PDUs. The increase wait timer value may be compared to a minimum increase wait time value, MinIncreaseWait. A TMQ.size value may measure a current number of stored packets in a TMQ associated with the FAN flow that are awaiting transmission.

In step 1102, an initial state, or New Start, state for the congestion avoidance state machine may be represented by CA_Mode=0. In the CA_Mode=0 state, a rate for transmitting DLL PDUs may increase and/or decrease based on current parameter values utilized by a token bucket (TB) block 716a. A transition from the congestion state CA_Mode=0 to CA_Mode=1 may occur when the FDT receives a congestion notification message. The congestion notification message may comprise a rate decrease request. Upon receipt of the congestion notification message, the NoCNTimer value may be reset to a value NoCNTimer=0, for example.

In step 1104, a congestion avoidance state for the congestion avoidance state machine, Cong Avoidance, may be represented by CA_Mode=1. In the CA_Mode=1 state, a rate for transmitting DLL PDUs may decrease in response to receipt of the congestion notification message. The NoCNTimer value may be incremented but may be reset if a subsequent congestion notification message is received. If the TMQ queue level decreases to 0, and the NoCNTimer value exceeds the NoCNTimeout value and the current rate of transmission TMQ.rate is equal to the maximum rate of transmission (MaxRate), a transition from the congestion state CA_Mode=1 to CA_Mode=0 may occur. The value TMQ.size=0 may indicate that the TMQ queue level has decreased to 0.

Figure 12A:
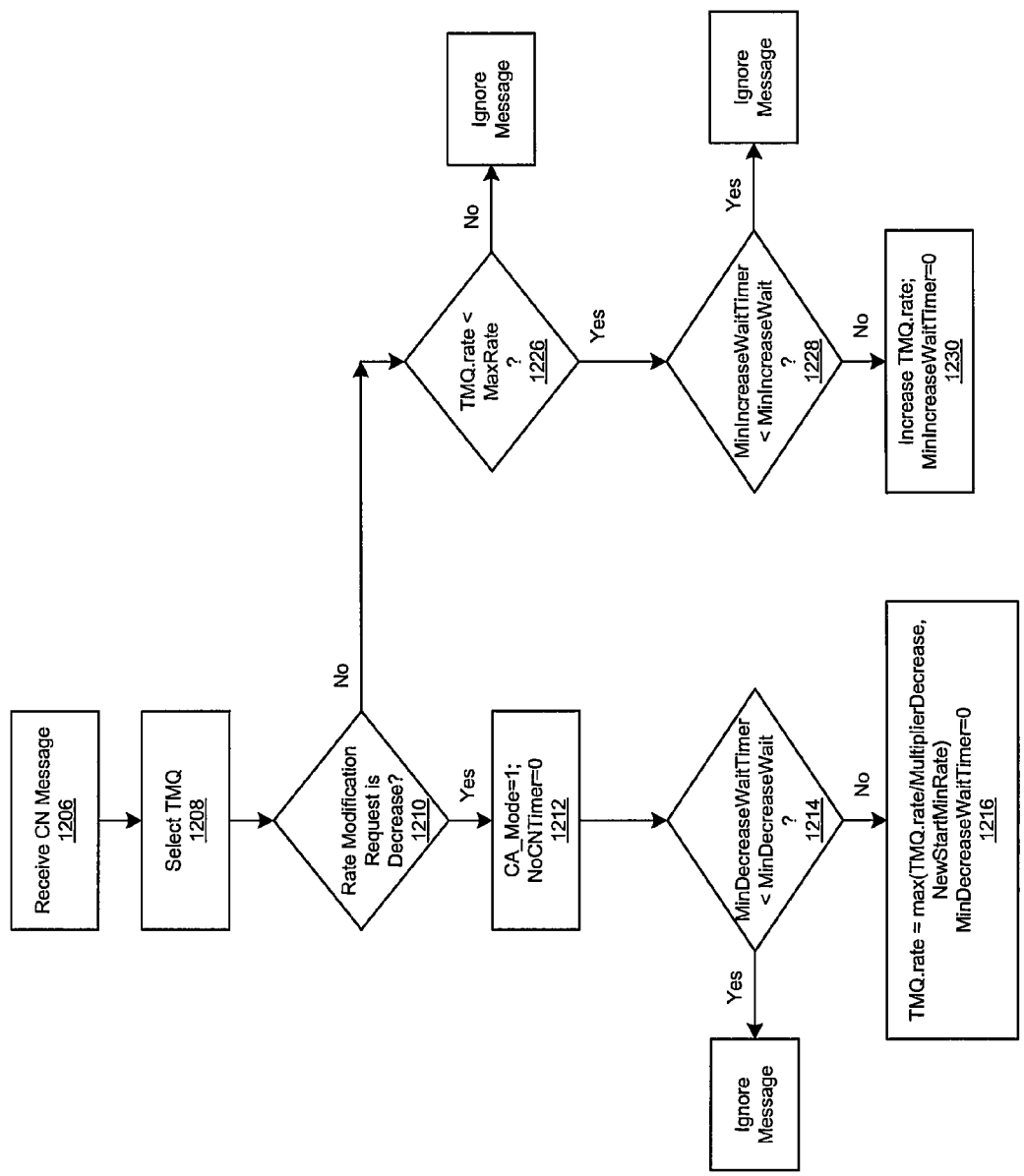
FIG. 12A is a flow chart illustrating exemplary steps for congestion avoidance at a source endpoint, in accordance with an embodiment of the invention.

FIG. 12A is a flow chart illustrating exemplary steps for congestion avoidance at a source endpoint, in accordance with an embodiment of the invention. Referring to FIG. 12A, in step 1206, a congestion notification message may be received at the FDT 2 712. In step 1208, the FDT 2 712 may select a TMQ. The selected TMQ may be determined for a particular FAN flow which is identified based on the contents of the congestion notification message 1002. Step 1210 may determine whether the transmission rate modification request 1012 contained within the congestion notification message 1002 is a decrease request.

If the rate modification request in step 1210 is a decrease request, in step 1212, the congestion avoidance state may transition to a Cong Avoidance state, as indicated by the congestion state variable CA_Mode=1. The NoCNTimer state variable may be initialized to NoCNTimer=0. Step 1214 may determine whether a minimum time duration has occurred since a last decrease in the rate for transmitting DLL PDUs, as indicated by the relationship MinDecreaseWaitTimer<MinDecreaseWait. When the condition, MinDecreaseWaitTimer<MinDecreaseWait, is true messages may be ignored.

If the minimum time duration in step 1214 has not occurred, in step 1216, a subsequent rate of transmission of DLL PDUs, TMQ.rate, may be computed based on the current TMQ.rate, and a MultiplierDecrease factor, where the MultiplierDecrease factor is a number that may be utilized to divide the current TMQ.rate thereby producing the subsequent TMQ.rate. The current TMQ.rate and subsequent TMQ.rate may be greater than or equal to a minimum rate of transmission, as defined by the parameter NewStartMinRate.

If the rate modification request in step 1210 is an increase request, step 1226 may determine whether the current rate of transmission, TMQ.rate, is greater than a maximum rate of transmission, as defined by the parameter MaxRate. When the condition, TMQ.rate<MaxRate, is not true messages may be ignored. If TMQ.rate is less than MaxRate, step 1228 may determine whether a minimum time duration has occurred since a last increase in the rate for transmitting DLL PDUs, as indicated by the relationship MinIncreaseWaitTimer< MinIncreaseWait. When the condition, MinIncreaseWait- Timer<MinIncreaseWait, is true messages may be ignored. If the minimum time duration has not occurred in step 1228, in step 1230, a subsequent TMQ.rate may be computed by increasing the current TMQ.rate. The MinIncreaseWaitTimer may be reset to a value MinIncreaseWaitTimer=0.

Figure 12B:
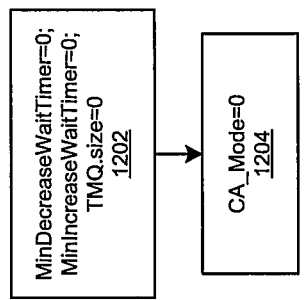
FIG. 12B is a flow chart illustrating exemplary initialization steps for congestion avoidance at a source endpoint, in accordance with an embodiment of the invention.

FIG. 12B is a flow chart illustrating exemplary initialization steps for congestion avoidance at a source endpoint, in accordance with an embodiment of the invention. FIG. 12B illustrates exemplary initialization steps, which may be performed in connection with the flow chart illustrated in FIG. 12A. Referring to FIG. 12B, in step 1202, variables MinDecreaseWaitTimer, MinIncreaseWaitTimer, and TMQ.size may each be initialized to a value 0. In step 1204, the congestion avoidance state may be set to the New Start state as indicated by the congestion state variable CA_Mode=0.

Figure 12C:
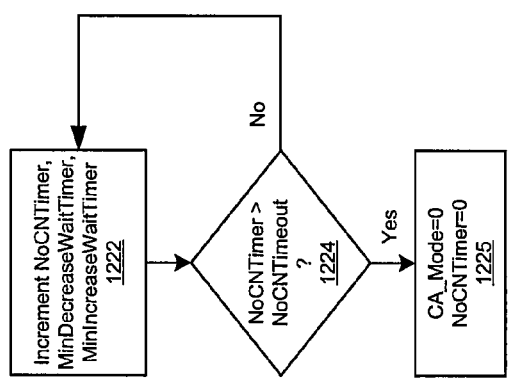
FIG. 12C is a flow chart illustrating exemplary steps for updating state variables for congestion avoidance at a source endpoint, in accordance with an embodiment of the invention.

FIG. 12C is a flow chart illustrating exemplary steps for updating state variables for congestion avoidance at a source endpoint, in accordance with an embodiment of the invention. FIG. 12C illustrates an exemplary method to update the values of state variable, which may be performed in connection with the flow chart illustrated in FIG. 12A. Referring to FIG. 12C, in step 1222, congestion state variables NoCNTimer, MinDecreaseWaitTimer, and MinIncreaseWaitTimer, may each be incremented. Step 1224 may determine whether a minimum time duration has occurred since a last congestion notification message has been received. If the minimum time duration in step 1224 has occurred, in 1225 the state variables CA_Mode and NoCNTimer may each be set to a value of zero (0). If the minimum time duration has in step 1224 has not occurred, step 1222 may follow.

Figure 13:
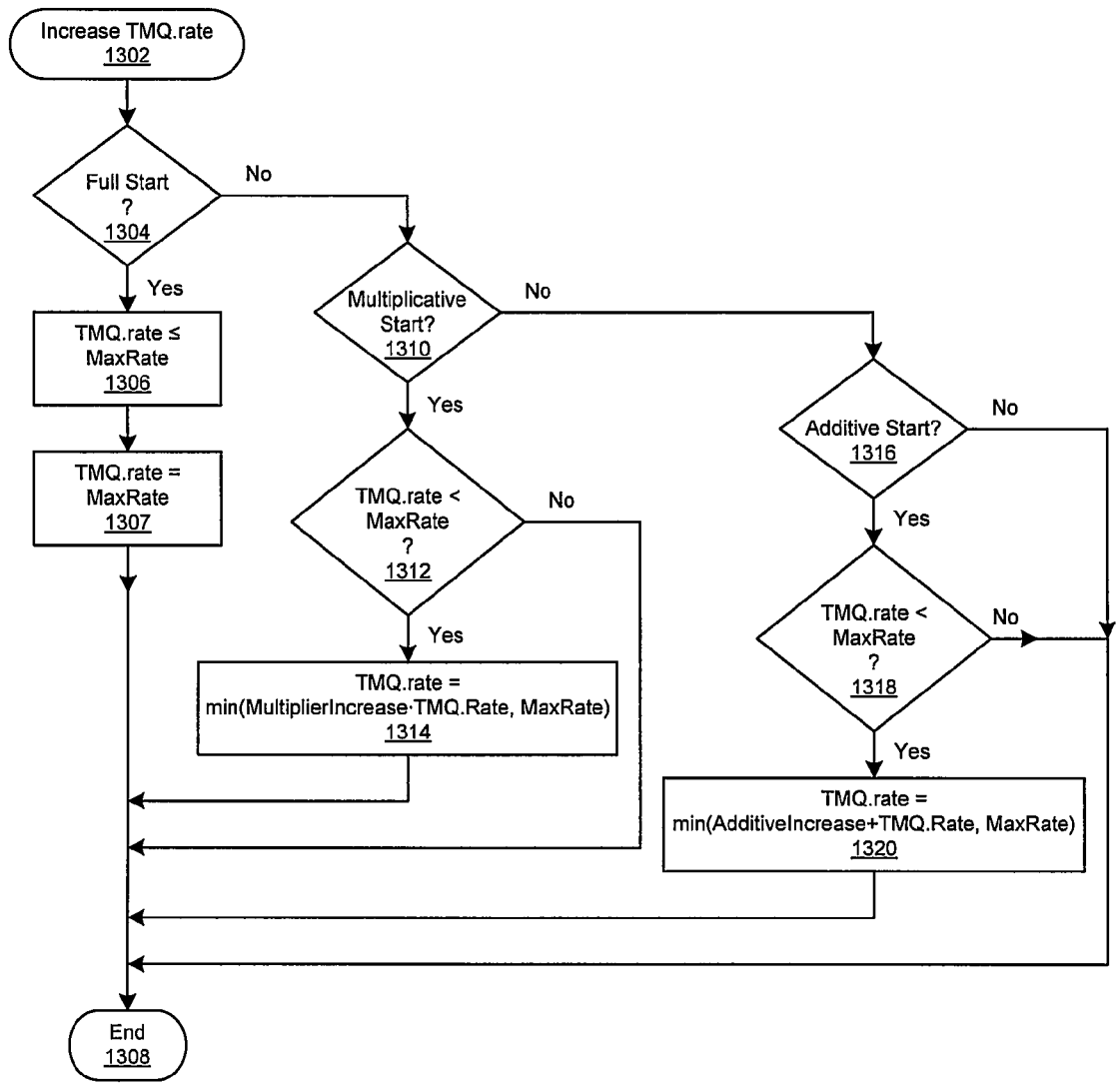
FIG. 13 is a flow chart illustrating exemplary steps for increasing a data rate for a traffic management queue at a source endpoint, in accordance with an embodiment of the invention.

FIG. 13 is a flow chart illustrating exemplary steps for increasing a data rate for a traffic management queue at a source endpoint, in accordance with an embodiment of the invention. FIG. 13 presents a flow chart that describes a method for increasing a current TMQ.rate to produce a subsequent TMQ.rate. Referring to FIG. 13, step 1302 may indicate that a TMQ.rate is to be increased. Step 1304 may determine whether the data rate increase method is based on a Full Start policy.

If the data rate increase method in 1304 is based on a Full Start policy, in step 1306, the TMQ.rate may be increased subject to the condition that the TMQ.rate not exceed the MaxRate. In step 1307, the TMQ.rate may equal the MaxRate. Step 1308 may indicate an end of the data rate increase procedure. If the data rate increase method in step 1304 is not based on a Full Start policy, step 1310 may determine whether the data rate increase method is based on a Multiplicative Start policy. If the data rate increase method in step 1310 is based on a Multiplicative Start policy, step 1312 may determine whether the current TMQ.rate is less than the MaxRate.

If the TMQ.rate in step 1312 is less than the MaxRate, in step 1314, the subsequent TMQ.rate may be computed by multiplying the current TMQ.rate by a MultiplierIncrease factor. The maximum value for the subsequent TMQ.rate may be the MaxRate. Step 1308 may follow. If the TMQ.rate in step 1312 is not less than the MaxRate, step 1308 may follow.

If the data rate increase method in step 1310 is not based no a Multiplicative Start policy, step 1316 may determine whether the current TMQ.rate is based on an Additive Start policy. If the data rate increase method in step 1316 is based on an Additive Start policy, step 1318 may determine whether the current TMQ.rate is less than the MaxRate. If the TMQ.rate in step 1318 is less than the MaxRate, in step 1320, the subsequent TMQ.rate may be computed by adding the current TMQ.rate and an AdditiveIncrease factor. The maximum value for the subsequent TMQ.rate may be the MaxRate. Step 1308 may follow. If the TMQ.rate in step 1318 is not less than the MaxRate, step 1308 may follow. If the data rate increase method in step 1316 is not based on an Additive Start policy, step 1308 may follow.

Aspects of a system for end-to-end congestion avoidance in a switch fabric may comprise a fan domain transmitter (FDT) 702 that enables reception of a congestion notification message that specifies a traffic flow identifier. The FDT 702 may enable increase or decrease of a current rate for transmission of data link layer (DLL) protocol data units (PDU) associated with the specified traffic flow identifier as a response to the reception of the congestion notification message. The response to the reception of the congestion notification message may be determined based on a congestion avoidance mode, and/or a congestion notification timer value. Transition of the congestion avoidance mode from a first congestion state to a second congestion state may be based on the reception of the congestion notification message. Transition of the congestion avoidance mode from a second congestion state to a first congestion state may occur when a congestion notification timer value is greater than a timeout value. The congestion notification timer value may measure a time duration following a time instant at receipt of a last congestion notification message. The congestion notification message may comprise a transmitter index, a path index, a priority group identifier, a receiver index, and/or a transmission rate modification request. The transmission rate modification request may comprises an increase request, or a decrease request. The decrease in the current rate of transmission may occur when the transmission rate modification request is a decrease request, and a decrease wait timer value is greater than or equal to a minimum decrease wait time value. The decrease wait timer value may measure a time duration following a time instant of a last decrease in a rate for transmitting the DLL PDUs.

The FDT 702 may enable computation of a subsequent rate for transmitting the DLL PDUs by division of the current rate by a decrease factor. The increase of the current rate of transmission may occur when the transmission rate modification request is an increase request, and an increase wait timer value is greater than or equal to a minimum increase wait time value. The increase wait timer value may measure a time duration following a time instant of a last increase in a rate for transmitting the DLL PDUs. A subsequent rate for transmission of DLL PDUs may be computed by multiplication of the current rate by a multiplicative increase factor. A subsequent rate for transmission of DLL PDUs may be computed by addition of the current rate and an additive increase factor. A result of the increase of the current rate is less than or equal to a maximum rate.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling data transmission in a communications system, the method comprising:
    receiving, by a network device, a congestion notification message that specifies a traffic flow identifier, wherein:
        said congestion notification message is generated by a peer network device based on one or more congestion indications that are triggered by one or more switching devices external to both said network device and said peer network device, and
        said one or more switching devices are traversed during transport of traffic between an egress port of said network device and an ingress port of said peer network device or between an egress port of said peer network device and an ingress port of said network device; and
    selecting between increasing or decreasing a current rate for transmitting data link layer (DLL) protocol data units (PDUs) associated with said specified traffic flow identifier in response to:
        receiving said congestion notification message, and
        determining that a wait timer value associated with modifying said current rate for transmitting DLL PDUs is greater than or equal to a minimum wait timer value.

2. The method according to claim 1, wherein said congestion notification message comprises one or more of a transmitter index, a path index, a priority group identifier, a receiver index, and/or a transmission rate modification request.

3. The method according to claim 2, wherein said transmission rate modification request comprises an increase request or a decrease request.

4. The method according to claim 3, wherein said decreasing said current rate occurs when said transmission rate modification request is said decrease request and a decrease wait timer value is greater than or equal to a minimum decrease wait time value.

5. The method according to claim 4, wherein said decrease wait timer value measures a time duration following a time of a last decrease in a rate for transmitting said DLL PDUs.

6. The method according to claim 4, comprising computing a subsequent rate for transmitting said DLL PDUs by dividing said current rate by a decrease factor.

7. The method according to claim 3, wherein said increasing said current rate occurs when said transmission rate modification request is said increase request and an increase wait timer value is greater than or equal to a minimum increase wait time value.

8. The method according to claim 7, wherein said increase wait timer value measures a time duration following a time of a last increase in a rate for transmitting said DLL PDUs.

9. The method according to claim 7, comprising computing a subsequent rate for transmitting said DLL PDUs by multiplying said current rate by a multiplicative increase factor.

10. The method according to claim 7, comprising computing a subsequent rate for transmitting said DLL PDUs by adding said current rate and an additive increase factor.

11. The method according to claim 7, wherein said increased said current rate is less than or equal to a maximum, rate.

12. The method of claim 1, wherein said congestion notification message comprises a transmission rate modification request, and wherein said selecting between increasing or decreasing said current rate for transmitting DLL PDUs is in further response to said transmission rate modification request.

13. The method of claim 12, wherein:
    said transmission rate modification request comprises an increase request or a decrease request,
    said minimum wait timer value is a minimum decrease wait time value or a minimum increase wait time value,
    said decreasing said current rate occurs when said transmission rate modification request is said decrease request and said wait timer wine is greater than or equal to said minimum decrease wait time value, and
    said increasing said current rate occurs when said transmission rate modification request is said increase request and said wait timer value is greater than or equal to said minimum increase wait time value.

14. A method for controlling data transmission in a communications system, the method comprising:
    receiving, by a network device, a congestion notification message that specifies a traffic flow identifier, wherein:
        said congestion notification message is generated by a peer network device based on one or more congestion indications that are triggered by one or more switching devices external to both said network device and said peer network device, and
        said one or more switching devices are traversed during transport of traffic between said network device and said peer network device; and
    selecting between increasing or decreasing, based on a congestion avoidance mode variable and a congestion notification timer value, a current rate for transmitting data link layer (DLL) protocol data units (PDUs) associated with said specified traffic flow identifier in response to receiving said congestion notification message.

15. The method according to claim 14, comprising transitioning a congestion avoidance mode from a first congestion state to a second congestion state when said congestion notification timer value is greater than a timeout value.

16. The method according to claim 15, wherein said congestion notification timer value measures a time duration following a time at receipt of a last congestion notification message.

17. A system for controlling data transmission in a communications system, the system comprising:
    at least one circuit for use in a network device, said at least one circuit enables reception by said network device of a congestion notification message that specifies a traffic flow identifier, wherein:
        said congestion notification message is generated by a peer network device based on one or more congestion indications that are triggered by one or more switching devices external to both said network device and said peer network device, said one or more switching device are traversed during transport of traffic between an egress port of said network device and an ingress port of said peer network device, or between an egress port of said peer network device and an ingress port of said network device, and said at least one circuit enables selection between increasing or decreasing a current rate for transmission of data link layer (DLL) protocol data units (PDUs) associated with said specified traffic flow identifier in response to:

receiving said congestion notification message, and determining that a wait timer value associated with modifying said current rate for transmitting DLL PDUs is greater than or equal to a minimum wait timer value.

18. The system according to claim 17, wherein said at least one circuit enables said selection between increasing or decreasing said current rate for transmission of DLL PDUs based on said wait timer value and a congestion avoidance mode variable.

19. The system according to claim 18, wherein said at least one circuit enables transition of a congestion avoidance mode from a first congestion state to a second congestion state when said wait timer value is greater than a timeout value.

20. The system according to claim 19, wherein said wait timer value measures a time duration following a time at receipt of a last congestion notification message.

21. The system according to claim 17, wherein said congestion notification message comprises one or more of a transmitter index, a path index, a priority group identifier, a receiver index, and/or a transmission rate modification request.

22. The system according to claim 21, wherein said transmission rate modification request comprises an increase request or a decrease request.

23. The system according to claim 22, wherein said decrease of said current rate occurs when said transmission rate modification request is said decrease request and a decrease wait timer value is greater than or equal to a minimum decrease wait time value.

24. The system according to claim 23, wherein said decrease wait timer value measures a time duration following a time of a last decrease in a rate for transmitting said DLL PDUs.

25. The system according to claim 23, wherein said at least one circuit enables computation of a subsequent rate for transmitting said DLL PDUs by division of said current rate by a decrease factor.

26. The system according to claim 22, wherein said increase of said current rate occurs when said transmission rate modification request is said increase request and an increase wait timer value is greater than or equal to a minimum increase wait time value.

27. The system according to claim 26, wherein said increase wait timer value measures a time duration following a time of a last increase in a rate for transmitting said DLL PDUs.

28. The system according to claim 26, wherein said at least one circuit enables computation of a subsequent rate for transmission of said DLL PDUs by multiplication of said current rate by a multiplicative increase factor.

29. The system according to claim 26, wherein said at least one circuit enables computation of a subsequent rate for transmission of said DLL PDUs by addition of said current rate and an additive increase factor.

30. The system according to claim 26, wherein said increase of said current rate is less than or equal to a maximum rate.

* * * * *

UNITED STATES PATENT AND TRADEMARK OFFICE
CERTIFICATE OF CORRECTION

| | | |
|---|---|---|
| PATENT NO. | : 8,520,517 B2 | Page 1 of 1 |
| APPLICATION NO. | : 12/031914 | |
| DATED | : August 27, 2013 | |
| INVENTOR(S) | : Kwan et al. | |

It is certified that error appears in the above-identified patent and that said Letters Patent is hereby corrected as shown below:

In the Claims

At Column 18, line 11, please replace "maximum, rate" with --maximum rate--.

At Column 18, line 27, please replace "timer wine is" with --timer value is--.

Signed and Sealed this
Twenty-fourth Day of June, 2014

Michelle K. Lee
*Deputy Director of the United States Patent and Trademark Office*